(12) United States Patent
Kozu et al.

(10) Patent No.: US 7,759,001 B2
(45) Date of Patent: *Jul. 20, 2010

(54) BATTERY AND METHOD OF MANUFACTURING THE BATTERY

(75) Inventors: Katsumi Kozu, Sanda (JP); Takeshi Ishimaru, Moriguchi (JP); Satoshi Kataoka, Takaoka-gun (JP); Koichi Toriyama, Moriguchi (JP); Masahiro Mizuta, Souraku-gun (JP); Masaaki Kaneda, Hirakata (JP); Kenjin Masumoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 771 days.

This patent is subject to a terminal disclaimer.

(21) Appl. No.: 10/502,821

(22) PCT Filed: Feb. 6, 2003

(86) PCT No.: PCT/JP03/01271

§ 371 (c)(1),
(2), (4) Date: Jul. 27, 2004

(87) PCT Pub. No.: WO03/069698

PCT Pub. Date: Aug. 21, 2003

(65) Prior Publication Data

US 2005/0106454 A1    May 19, 2005

(30) Foreign Application Priority Data

Feb. 13, 2002 (JP) .............................. 2002-034925
Mar. 22, 2002 (JP) .............................. 2002-081242
Jan. 16, 2003 (JP) .............................. 2003-008638

(51) Int. Cl.
*H01M 2/02* (2006.01)
*H01M 2/04* (2006.01)
*H01M 10/04* (2006.01)

(52) U.S. Cl. .................. 429/175; 429/176; 29/623.1

(58) Field of Classification Search .................. None
See application file for complete search history.

(56) References Cited

U.S. PATENT DOCUMENTS

| | | | |
|---|---|---|---|
| 3,948,441 A | 4/1976 | Perkins et al. | |
| 5,106,708 A | 4/1992 | Bish et al. | |
| 5,298,347 A | 3/1994 | Aksoy et al. | |
| 5,466,545 A | 11/1995 | Chamberlain et al. | |
| 5,508,131 A | 4/1996 | Bowen et al. | |
| 5,626,982 A * | 5/1997 | Kawai et al. ............ | 429/120 |
| 5,818,198 A | 10/1998 | Mito et al. | |
| 5,968,682 A | 10/1999 | Moriyama et al. | |
| 6,114,942 A | 9/2000 | Kitamoto et al. | |

(Continued)

FOREIGN PATENT DOCUMENTS

EP    1 422 771    5/2004

(Continued)

*Primary Examiner*—Jonathan Crepeau
(74) *Attorney, Agent, or Firm*—Jordan and Hamburg LLP

(57) ABSTRACT

A circuit substrate (3) being electrically connected to a rechargeable battery (2) is arranged upon a sealing plate (23) with a gap therebetween and united with the rechargeable battery (2) by filling resin in the gap. A primary mold (11) formed by the resin is firmly retained by undercut portions formed in engaging protrusions (26). The engaging protrusions (26) may be formed by welding separate engaging members (126, 126a, 126b, 126c, 66, 68).

12 Claims, 16 Drawing Sheets

U.S. PATENT DOCUMENTS

| | | | |
|---|---|---|---|
| 6,117,576 | A | 9/2000 | Sugai |
| 6,210,824 | B1 | 4/2001 | Sullivan et al. |
| 6,432,575 | B1 | 8/2002 | Yamagami |
| 6,451,474 | B1 | 9/2002 | Kozu et al. |
| 6,524,732 | B1 | 2/2003 | Iwaizono et al. |
| 6,759,152 | B2 | 7/2004 | Iwaizono et al. |
| 6,824,917 | B2 | 11/2004 | Aaltonen et al. |
| 6,861,821 | B2 * | 3/2005 | Masumoto et al. .......... 320/107 |
| 6,893,753 | B2 | 5/2005 | Iwaizono et al. |
| 6,994,926 | B2 | 2/2006 | Ikeuchi et al. |
| 7,248,021 | B2 | 7/2007 | Kozu et al. |
| 2002/0173709 | A1 | 11/2002 | Fine et al. |
| 2003/0082441 | A1 | 5/2003 | Hovi et al. |
| 2003/0173709 | A1 | 9/2003 | Iwaizono et al. |
| 2005/0064286 | A1 | 3/2005 | Kozu et al. |
| 2005/0106454 | A1 | 5/2005 | Kozu et al. |
| 2005/0112456 | A1 | 5/2005 | Kozu et al. |
| 2005/0151514 | A1 | 7/2005 | Kozu et al. |
| 2005/0164080 | A1 | 7/2005 | Kozu et al. |

FOREIGN PATENT DOCUMENTS

| | | | |
|---|---|---|---|
| JP | 62-184760 | | 8/1987 |
| JP | 63-019774 | | 1/1988 |
| JP | 64-072458 | | 3/1989 |
| JP | 4-162345 | | 6/1992 |
| JP | 05-159758 | | 6/1993 |
| JP | 07-057721 | | 3/1995 |
| JP | 8-162078 | | 6/1996 |
| JP | 9-134714 | | 5/1997 |
| JP | 9-139235 | | 5/1997 |
| JP | 10-275612 | | 10/1998 |
| JP | 11-176400 | | 7/1999 |
| JP | 11-289168 | | 10/1999 |
| JP | 2000-021372 | | 1/2000 |
| JP | 2000-315483 | | 11/2000 |
| JP | 2002-110121 | | 4/2002 |
| JP | 2002-134077 | | 5/2002 |
| JP | 2002-166447 | | 6/2002 |
| JP | 2002-245994 | | 8/2002 |
| JP | 2002-245999 | | 8/2002 |
| JP | 2002-260608 | | 9/2002 |
| JP | 2002-260609 | | 9/2002 |
| JP | 2002-373630 | | 12/2002 |
| JP | 2003-017022 | | 1/2003 |
| JP | 2003-022789 | | 1/2003 |
| JP | 2003-086159 | | 3/2003 |
| KR | 2000-00001908 | | 1/2000 |
| KR | 2001-0043946 | | 5/2001 |
| WO | WO 03/003485 | * | 1/2003 |

* cited by examiner

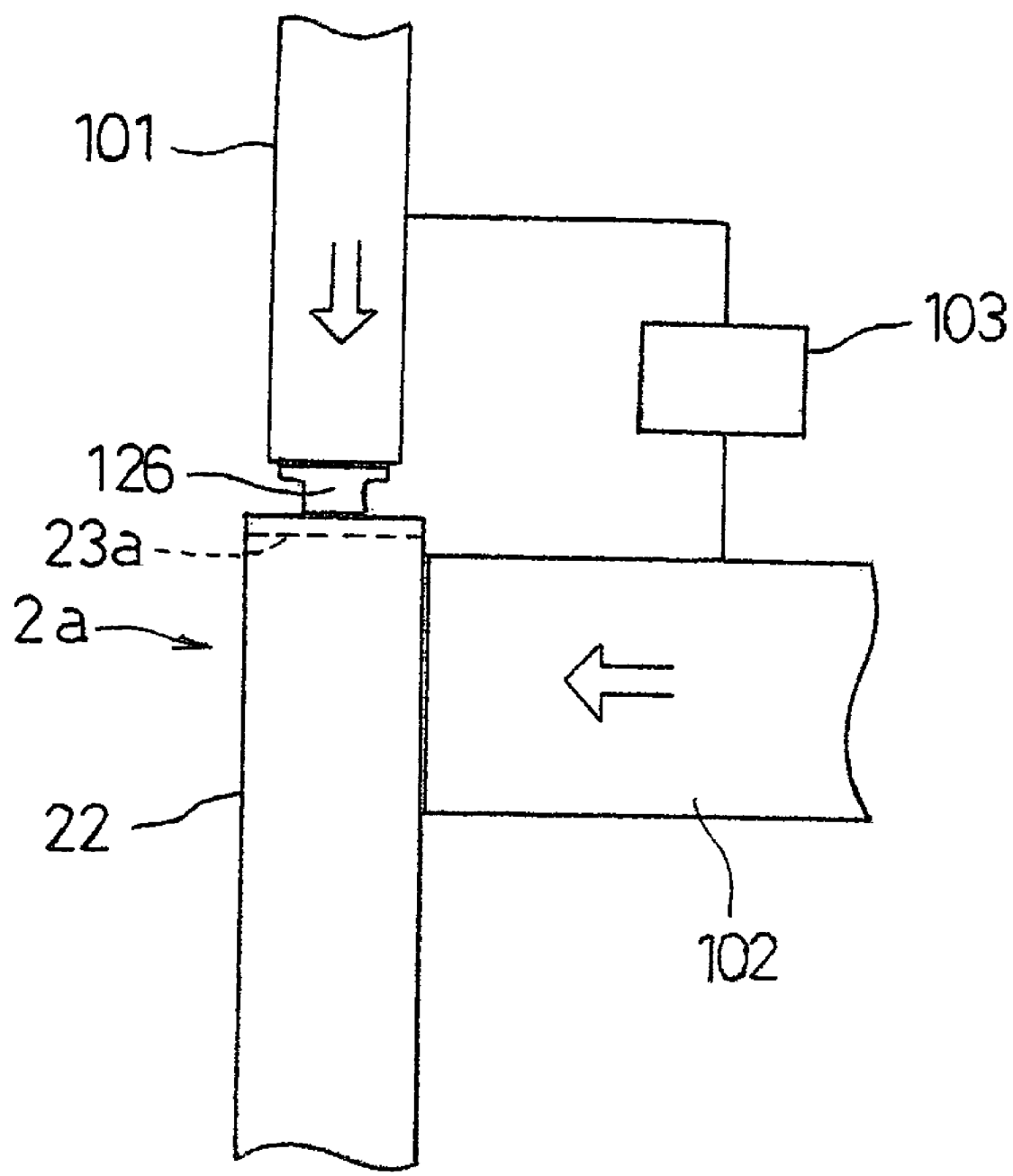

BATTERY AND METHOD OF MANUFACTURING THE BATTERY

TECHNICAL FIELD

The present invention relates to a battery formed with engaging parts to retain resin on a given surface of the battery to fixedly unite the battery with a circuit substrate formed with a battery protection circuit and external terminals by the resin to form a battery pack, and a manufacturing method thereof.

BACKGROUND ART

With the remarkable development of small, thin, and high-functionality portable electronic equipment such as mobile phones and PDAs, there is a growing demand for smaller, thinner, and high-capacity batteries as their power source. Lithium ion rechargeable batteries can be designed small and high-capacity, and in particular, flat prismatic types are suitable in making the equipment thinner; they have therefore been increasingly used as the repeatedly usable rechargeable battery for portable electronic equipment.

Because lithium ion rechargeable batteries have high energy density and contain a flammable organic solvent as electrolyte, it is essential to take account of safety measures. They must have such safety features as to ensure that no damage is caused to the equipment or injury to the user in the event that an abnormality arises for some reason. For example, if the positive and negative terminals of the battery are short-circuited for some reason, a large short-circuit current flows in high energy density batteries, whereupon the inner resistance generates Joule heat and the battery temperature rises. A temperature rise in the battery leads to a rapid increasing of gas pressure inside resulting from reactions between positive electrode active materials and electrolyte, or from evaporation or decomposition of electrolyte, which may cause fire or explosion of the battery. Batteries may fall into a high-temperature state not only because of external short-circuiting but also of overcharge; the same applies if the portable electronic equipment loaded with the battery is placed near a heater or left inside a car parked in a hot weather environment.

A battery abnormality can be induced by any of electrical, mechanical, or thermal factors; thus non-aqueous electrolyte batteries represented by lithium ion rechargeable batteries are provided with safety features for preventing batteries from falling into an abnormal state and for evading a further dangerous state even if an abnormality should arise. Such features are usually incorporated in batteries as their own natures; for example, active materials on the electrodes and electrolyte may be made not to be excessively reactive, or, a polyolefin porous film may be employed for the separator because of its "shutdown function," in which minute pores are softened and close under an abnormally high temperature. Cylindrical lithium ion rechargeable batteries are usually provided with a protective feature such as a Positive Temperature Coefficient (PTC) element connected in series to the input/output circuit at the sealing end, which limits current flow in the event of external short-circuiting. Batteries that do not include the PTC element inside are normally provided with a PTC element or temperature fuse as outside circuit components. Further, a circuit for protecting the battery from overcharge and over discharge is an absolute requirement. In general, these constituent elements are all packed with the battery inside a pack case to form a battery pack.

However, battery packs using pack cases are not suited to portable electronic equipment that are re-modeled in short cycles, because the manufacturing cost of molding dies used in the resin molding of pack cases tends to be high, and the time required for designing new molding dies is relatively long. Thinner battery packs with resin-molded pack case as an outer case also have limitations in making portable electronic equipment smaller and thinner because of the limitations on the moldable thickness in the resin molding process.

Furthermore, in order to prevent the user from disassembling a battery pack for wrong use or for satisfying curiosity, it must have a design that is hardly disassemblable, or a design that alerts the user that it has been disassembled. Taking account that the battery packs are used for portable electronic equipment, they also need to have a rigid structure that can withstand vibration or shocks in a falling accident, and a moisture resistance, particularly for the electronic circuit parts. In achieving the structure having a disassemblablity, a certain rigidity, and a moisture resistant, the idea has emerged that a battery may be united with a circuit substrate including a battery protective circuit by resin molding.

The applicants of the present invention have disclosed resin-molded battery packs in Japanese Laid-Open Patent Publications Nos. 2002-134077 and 2002-166447, in which a battery and a circuit substrate are connected by a connecting member to form an intermediate product, which is placed inside a die, and resin is filled around the intermediate product such as to expose external terminals formed on the substrate to the outside, to unite the battery with the substrate.

Japanese Laid-Open Patent Publication No. 2000-315483 discloses a structure in which a battery and a circuit substrate are connected by a connecting member and placed inside a die, and the circuit substrate is resin-sealed and fixed on the battery or its pack case (battery lid), or both the circuit substrate and the battery are resin-sealed.

Resin needs to be engaged with the circuit substrate and the rechargeable battery when uniting them by resin molding. While the circuit substrate has various protrusions and recesses because of electronic components and lead plates connected thereto and can retain molded resin well, the rechargeable battery has fewer such protrusions and recesses even at the sealing part; because the rechargeable battery is formed of a metal material with a flat surface that can hardly form a good bond with resin, the filled resin can easily come off after curing, resulting in unstable bond between the circuit substrate and the rechargeable battery. The rechargeable battery thus needs to be provided with some protrusions and recesses to retain the filled resin.

However, none of the above prior art examples shows a structure for retaining filled resin on the rechargeable battery; the resin may peel off when the rechargeable battery is subjected to an impact in a falling accident or the like and the circuit substrate may separate from the rechargeable battery, or, the battery may be disassembled for satisfying curiosity and put to wrong use because of the ease of disassembly.

It is an object of the invention to provide a battery formed with protrusions and/or recesses that function as engaging parts for uniting a circuit substrate with the battery by resin molding, and a manufacturing method thereof.

DISCLOSURE OF THE INVENTION

To achieve the above object, a battery according to a first aspect of the present invention comprises a protrusion and/or a recess which are formed on a given surface of the battery for retaining molded resin on the battery. A rigid, hardly disassemblable, and moisture resistant structure are obtained by connecting a circuit substrate or a terminal plate to the battery and uniting them by resin molding, which is suitable as a battery power source of portable electronic equipment. Molded resin hardly forms a firm bond with a flat surface of the battery and may peel off, but if there are engaging parts consisting of a protrusion or a recess provided in the resin-packed portion, it engages with the battery, and a rigid one-piece structure is obtained.

In the above structure, the protrusion and/or recess should preferably include an undercut portion that extends outward from the given surface, so that the undercut portion is embedded in the resin and provide an anchoring effect so as to ensure retention of resin.

The protrusion and/or recess may be formed by press-forming on the given surface so as to form a battery having a substrate or a terminal plate united therewith by resin molding.

The protrusion and/or recess may be provided by welding or bonding a separate member onto the given surface, whereby commonly available batteries are used instead of specially-processed batteries to form the batteries with the resin-molded one-piece structure.

The protrusion and/or recess maybe formed on the sealing plate so that a substrate or the like is fixed upon the sealing plate by resin, whereby electrical connection between the substrate or the like and the battery is readily established.

A battery according to a second aspect of the present invention comprises an engaging member which is attached on a given surface of the battery by resistance welding for retaining molded resin on the battery. When connecting a circuit substrate or a terminal plate to the battery and uniting them by resin molding, the engaging member retains the molded resin on the battery. Thus resin, which does not form a good bond with a metal flat surface of the battery, is firmly united with the battery.

The engaging member should preferably include an undercut portion that extends outward from the given surface, so that it provides an anchoring effect so as to ensure firm retention of resin on the battery.

The engaging member may be formed in a cylindrical shape having a face at one end that is bonded to the battery and a flange at the other end, or in a bottomed tube-like shape whose bottom face is bonded to the battery and whose open end is formed with a flange; the flange makes the undercut portion.

If the given surface of the battery is made of aluminum, the above cylindrical engaging member should preferably be made of iron that is plated with copper and then tin, or aluminum, so that there will be less sparking during the welding and less variation in the welding strength, whereby a reliable weld will be formed.

The engaging member should preferably be formed with one or a plurality of bosses on the surface that is bonded to the battery, so that the welding current concentrates in the boss and resistance welding is performed reliably. The boss will be melted by the concentration of welding current and flattened by pressure applied thereto, whereby the engaging member is bonded onto the given surface with a good bond.

A method for manufacturing a battery according to a third aspect of the present invention comprises the use of a constituent element formed with a protrusion and/or a recess for retaining filled resin on the battery. Batteries with a protrusion and/or a recess are readily produced by using a constituent element pre-formed with the protrusion and/or recess.

A method for manufacturing a battery according to a fourth aspect of the present invention comprises a separate component being bonded on a given surface of a complete battery to form a protrusion and/or a recess for retaining filled resin on the battery. By bonding a separate component on commonly available batteries to form the protrusion and/or recess, batteries with a protrusion and a recess are obtained without unnecessarily increasing the number of types of batteries.

A method for manufacturing a battery according to a fifth aspect of the present invention comprises the steps of: setting an engaging member, for retaining resin on the battery, on the battery in a predetermined position so that a bonding face thereof abuts on the battery; and applying a welding current across welding electrodes that are respectively in pressure contact with the engaging member and a portion that is electrically conductive with the predetermined position so as to weld the engaging member to the predetermined position of the battery. The welding current flows through the engaging member and the portion that is electrically conductive therewith, whereby the bonding face of the engaging member is welded to the predetermined position of the battery. By such welding of the engaging member, any commonly available batteries may be employed for the resin packing without preparing batteries specially provided with engaging member.

BRIEF DESCRIPTION OF THE DRAWINGS

FIG. 3 is a schematic view illustrating a method of welding the engaging members by resistance welding;

BEST MODE FOR CARRYING OUT THE INVENTION

Preferred embodiments of the present invention will be hereinafter described with reference to the accompanying drawings for an understanding of the invention. It should be understood that the following embodiments of the invention are merely given as examples and should not limit the technical scope of the invention.

The present embodiment shows one example of a battery pack employing a flat prismatic lithium ion rechargeable battery that is united with a circuit substrate including a battery protective circuit by resin molding and applied to a mobile phone. Battery packs for mobile phones need to be small, light-weight, and thin, and in addition, they are desired to have a high energy density in accordance with high functionality, a high mechanical strength to withstand impacts caused by a falling accident which is inevitable with portable equipment, a structure that does not allow easy disassembling, and safety features for protecting the rechargeable battery from short circuits, overcharge, and high temperature. The battery pack described below satisfies all these requirements by employing the rechargeable battery according to the present embodiment.

Figure 1A:
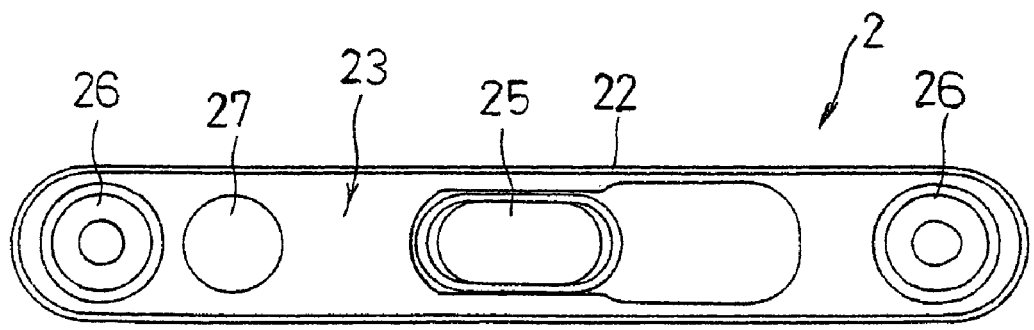
FIG. 1A and FIG. 1B illustrate the structure of a rechargeable battery according to one embodiment of the invention, FIG. 1A being a plan view and FIG. 1B being a cross-sectional view.
Figure 1B:
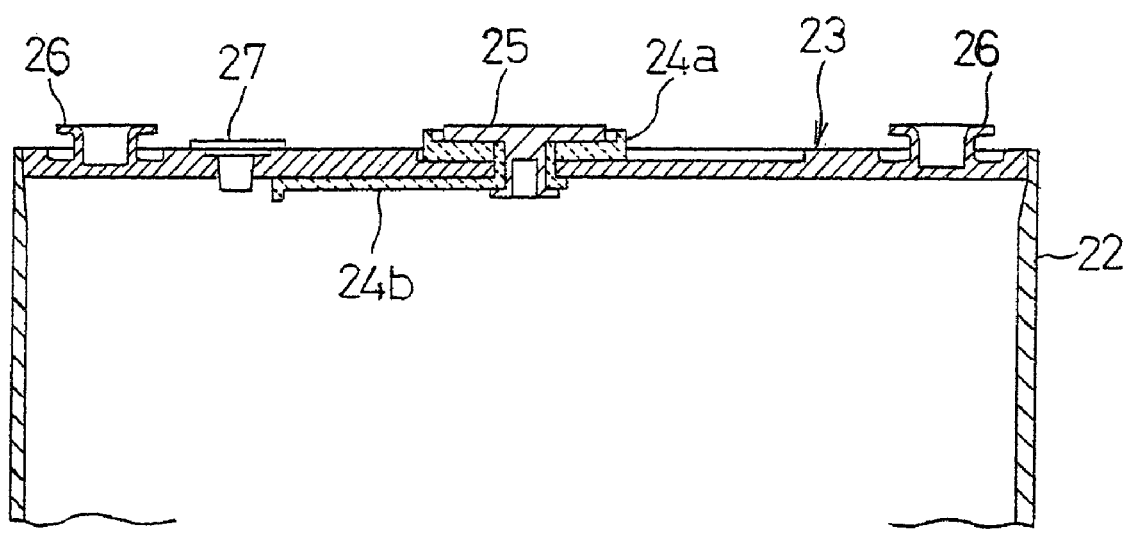

FIG. 1A and FIG. 1B illustrate the structure of a rechargeable battery 2 according to one embodiment of the invention. The rechargeable battery 2 is structured as a lithium ion rechargeable battery and accommodates elements for electromotive force in a bottomed tube-like aluminum case 22 having an oval cross section, the open end of the case being sealed with a sealing plate 23 by laser welding. The sealing plate 23 is joined to the case 22 and serves as the battery's positive electrode; a rivet 25 that serves as the negative electrode is mounted at the center of the sealing plate 23 and electrically insulated from the plate 23 by an upper gasket 24a and a lower gasket 24b. On both sides of the sealing plate 23 are mushroom-shaped engaging protrusions (engaging parts) 26, 26 that are provided by press-forming. Reference numeral 27 denotes a plug for closing a hole for pouring electrolyte; after the injection of electrolyte into the case 22, the hole is closed by the plug 27, which is then welded to the sealing plate 23.

The engaging protrusions 26 are formed into the mushroom shape as shown in FIG. 1B by first forming cylindrical projections at preset locations on the sealing plate 23 by pressing and spreading the tops of the projections by pressing.

Figure 2A:
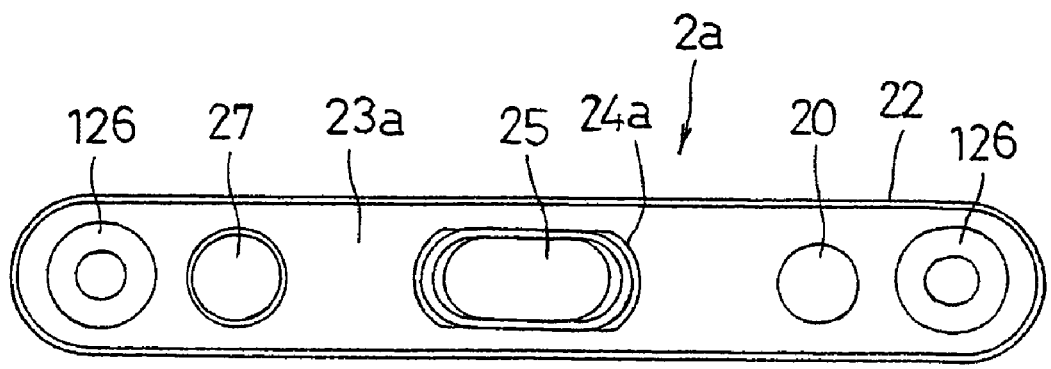
FIG. 2A and FIG. 2B illustrate the structure of a rechargeable battery with engaging members welded thereto according to one embodiment of the invention, FIG. 2A being a plan view and FIG. 2B being a cross-sectional view.
Figure 2B:
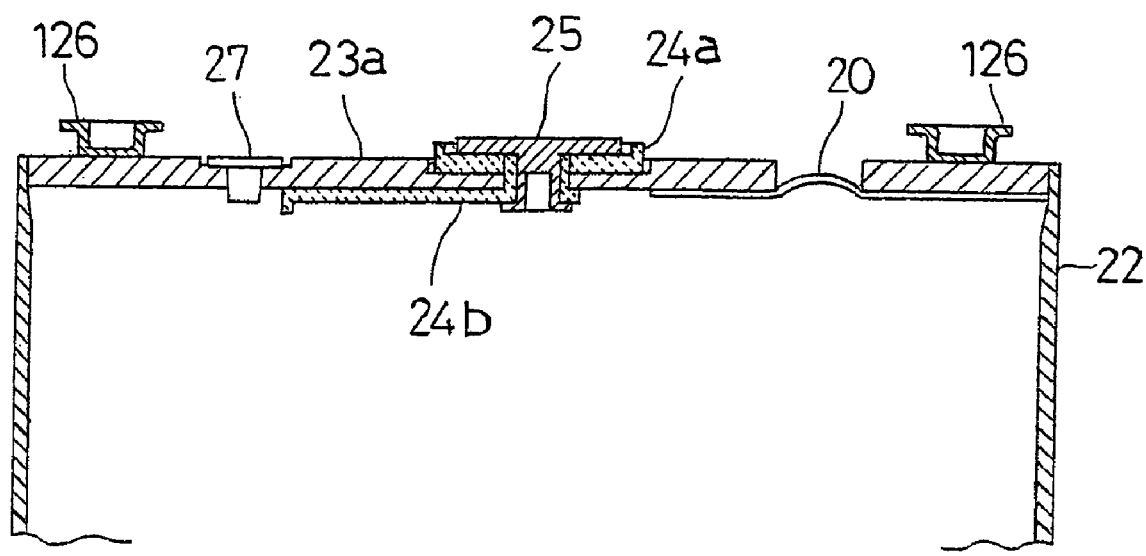

Alternatively, eyelet-like engaging members 126 may be welded on both sides of the sealing plate 23a of the rechargeable battery 2a as shown in FIG. 2A and FIG. 2B. The engaging members 126 are welded onto the sealing plate 23a of the battery 2a by resistance welding as follows: The engaging members 126 are set at predetermined locations on the sealing plate 23a of the rechargeable battery 2a, one welding electrode 101 is in pressure contact with the top of the engaging members 126 to press the engaging members 126 toward the sealing plate 23a, the other welding electrode 102 is in pressure contact with the battery case 22, and in this state welding current is applied from a power source 103 across welding electrodes 101, 102, as shown in FIG. 3.

Figure 4A:
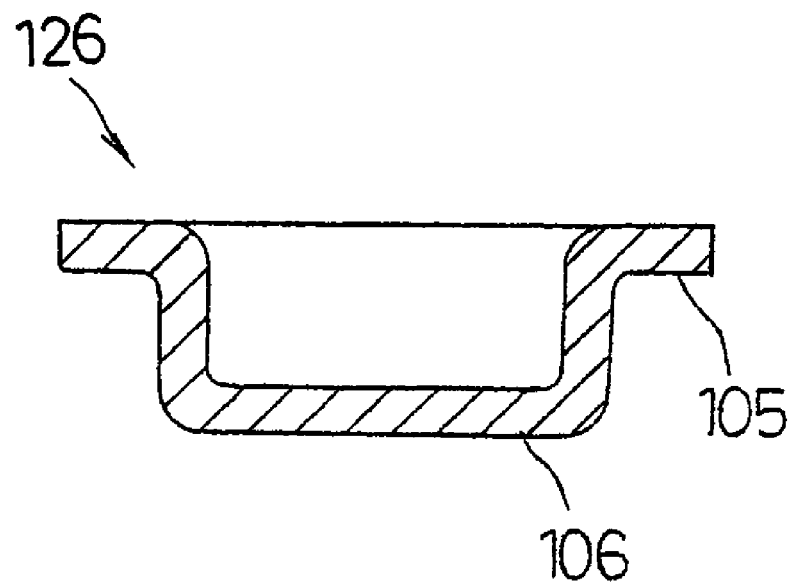
FIG. 4A and FIG. 4B are cross-sectional views illustrating examples of engaging members.
Figure 4B:
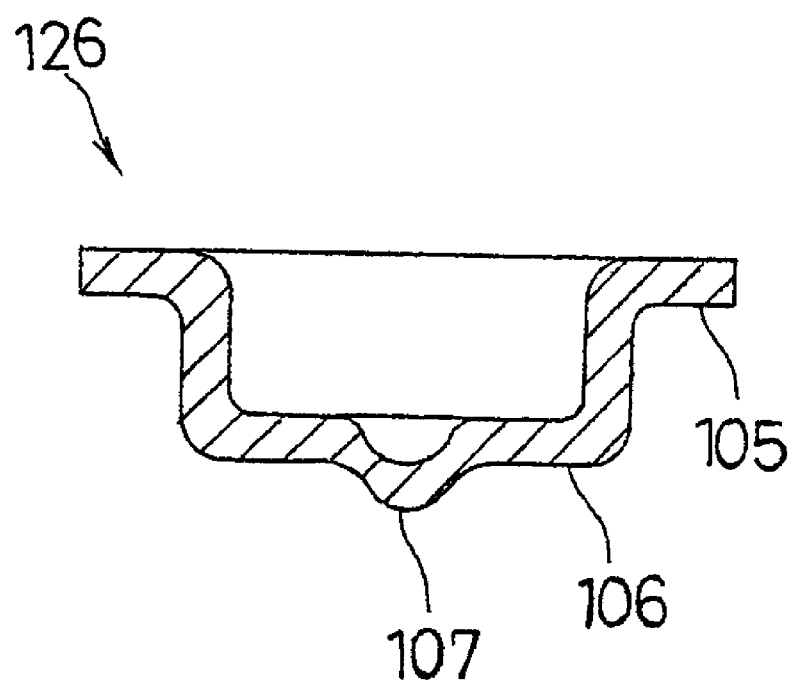

The engaging member 126 is pre-formed into a bottomed tube-like shape with a flange 105 at the top as shown in FIG. 4A by a press-forming process of a plate material. Further, it includes a boss 107 in the bottom face 106 which will be welded to the sealing plate 23a as shown in FIG. 4B, so that it is welded in a limited small area to form a reliable weld. That is, the welding current concentrates in the boss 107 and heat is generated from the resistance of the interfacing areas of the boss 107 and the sealing plate 23a to melt the interfacing areas, whereby the boss 107 is crushed by the pressure, and the bottom face of the engaging member 126 makes pressure contact with and is welded to the sealing plate 23a.

Figure 5A:
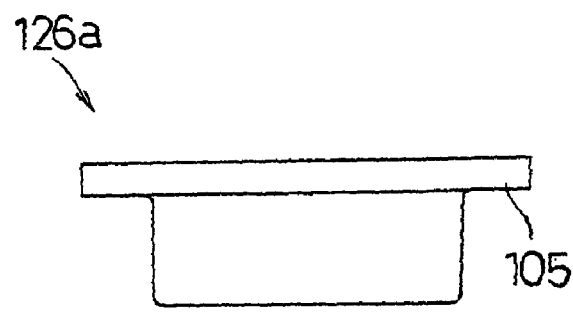
FIG. 5A to FIG. 5C are side views illustrating examples of engaging members.
Figure 5B:
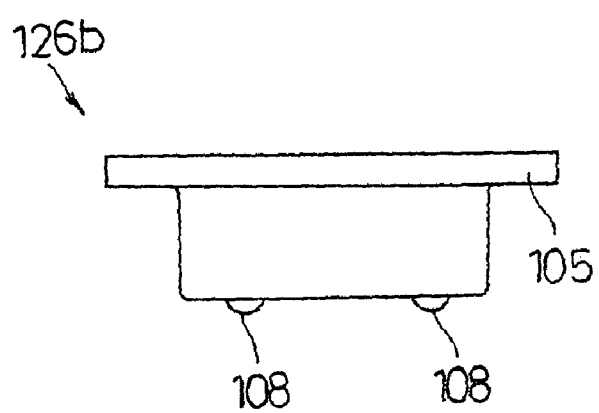
Figure 5C:
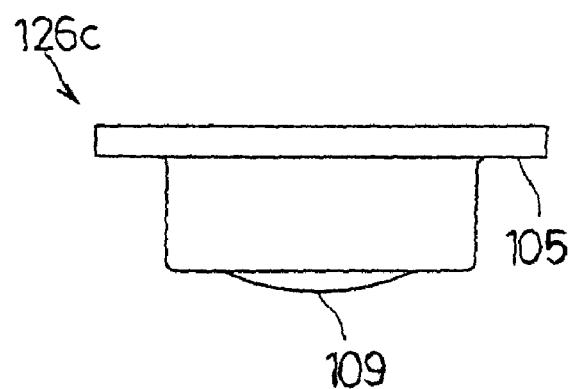

Further, the engaging member 126 may be formed into rivet-like engaging members 126a, 126b, 126c as shown in FIG. 5A to FIG. 5C. They each have a flange 105; the engaging member 126b of FIG. 5B is obtained by providing the engaging member 126a of FIG. 5A with a plurality of bosses 108 in the bottom face, and the engaging member 126c of FIG. 5C is obtained by forming a protrusion 109 in the bottom face of the engaging member 126a of FIG. 5A such that its apex coincides with the center of the bottom. These bosses 108 and protrusion 109 will form the parts where the welding current will be concentrated similarly to the bosses 107 described above so as to achieve reliable resistance welding at desired locations. If the battery case 22 and the sealing plate 23a are made of aluminum, these engaging members 126a, 126b, 126c should preferably be made of copper-and tin-plated iron, or aluminum, so that there will be less sparking during the welding and less variation in the welding strength to achieve stable welding operation.

Welding such engaging members 126 on the rechargeable battery 2a to form engaging parts with resin enables a battery pack to be formed using a commonly available rechargeable battery 2a instead of the dedicated rechargeable battery 2 that is processed by press-forming to have a sealing plate 23 with the engaging members 126.

In the case in which engaging protrusions 26 are formed by press-forming, the battery case 22 is provided with a thin portion by scribing or stamping in its body to provide a gas releasing structure for preventing explosion upon an abnormal increasing of internal pressure; in the event of an abnormal increasing in the internal pressure, the thin portion breaks to release gas to the outside. In a structure in which the engaging members 126 are mounted as separate components, a safety vent 20 that uses a clad material is provided in the sealing plate 23a as shown in FIG. 2A and FIG. 2B.

As shown in FIG. 2B, part of the sealing plate 23a is formed of a clad material of thin sheets, and an opening is formed in the portion of the clad material to form the safety vent 20. The safety vent 20 prevents explosion of the battery case 22 in the event of an abnormal increasing of internal pressure inside the case 22 because of a temperature rise or the like by breaking the thin sheet portion to release gas to the outside.

The following is a description of the structure of a battery pack 1 using the above rechargeable battery 2 or 2a that has the engaging protrusions 26 or engaging members 126 (126a, 126b, 126c).

Figure 6:
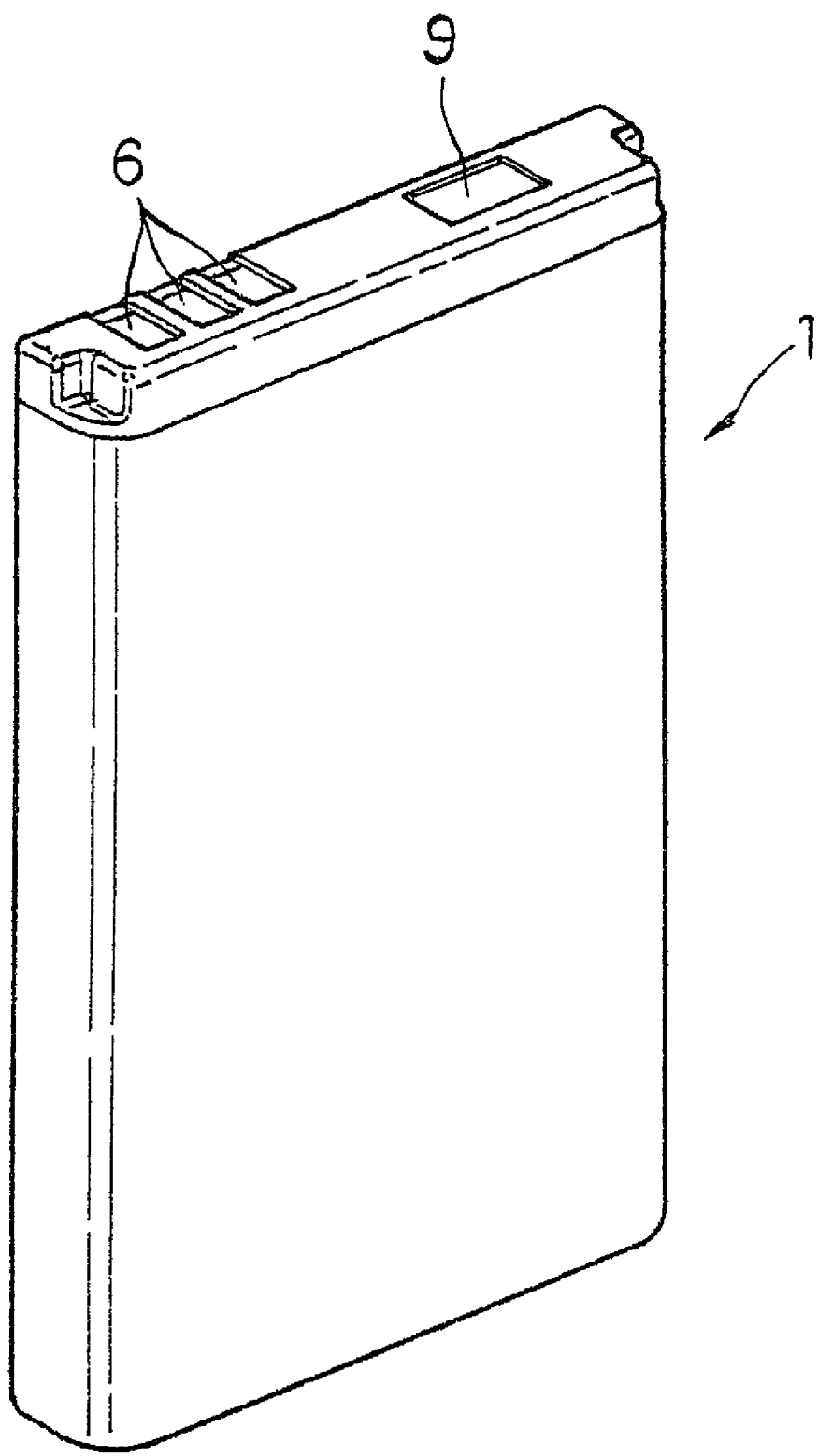
FIG. 6 is a perspective view illustrating an external appearance of a battery pack using the rechargeable battery according to one embodiment of the invention.
Figure 7:
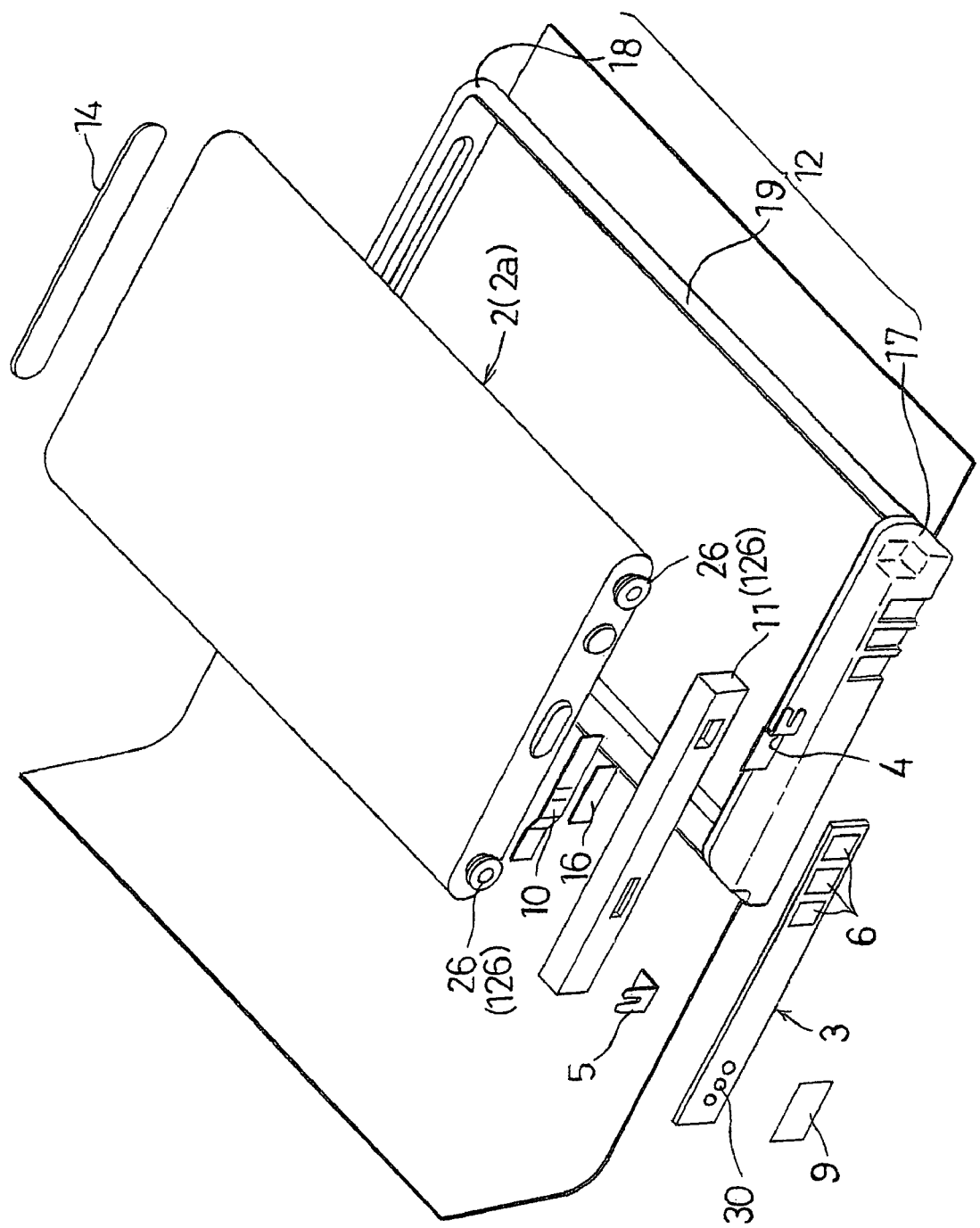
FIG. 7 is an exploded perspective view illustrating various constituent elements of the above battery pack.

FIG. 6 is an outer representation of the battery pack 1 of the above rechargeable battery 2 having a flat structure in an asymmetrical arrangement. On one end face are exposed external terminals 6 consisting of a positive terminal, a negative terminal, and a temperature detecting terminal, and a water ingress label 9 bonded onto a test terminal 30 which will be described later. FIG. 7 is an exploded view of this battery pack 1 showing its constituent elements. These elements and a manufacturing method of the battery pack 1 will be described below in detail.

Figure 8:
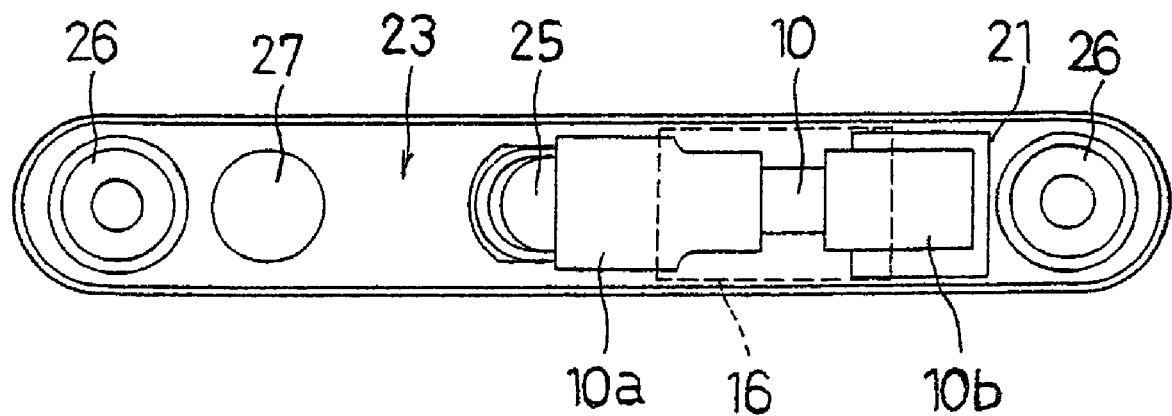
FIG. 8 is a plan view illustrating the rechargeable battery with a temperature fuse attached thereto.

In the case with using the rechargeable battery 2, as shown in FIG. 8, a connection piece 10a at one end of a temperature fuse 10 is welded to the rivet 25, and a heat insulation sheet 16 is affixed upon the upper face of the temperature fuse 10 so as to prevent fusion of the temperature fuse 10 during the resin filling process to be described later. A connection piece 10b at the other end of the temperature fuse 10 is placed upon an insulating paper 21 affixed on the sealing plate 23 and bonded to one end of a negative lead plate 5 to be described later by spot welding. Heat conductive adhesive is applied between the temperature fuse 10 and the rechargeable battery 2 so that they are heat-coupled to each other.

Figure 9A:
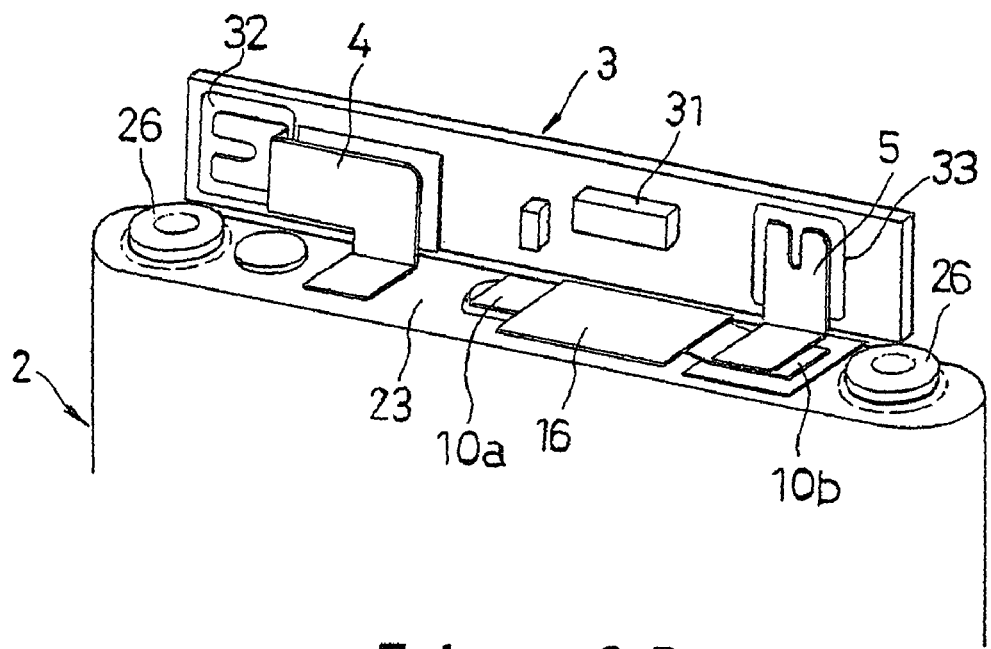
FIGS. 9A and 9B are perspective views illustrating the rechargeable battery with a circuit substrate attached thereto.
Figure 9B:
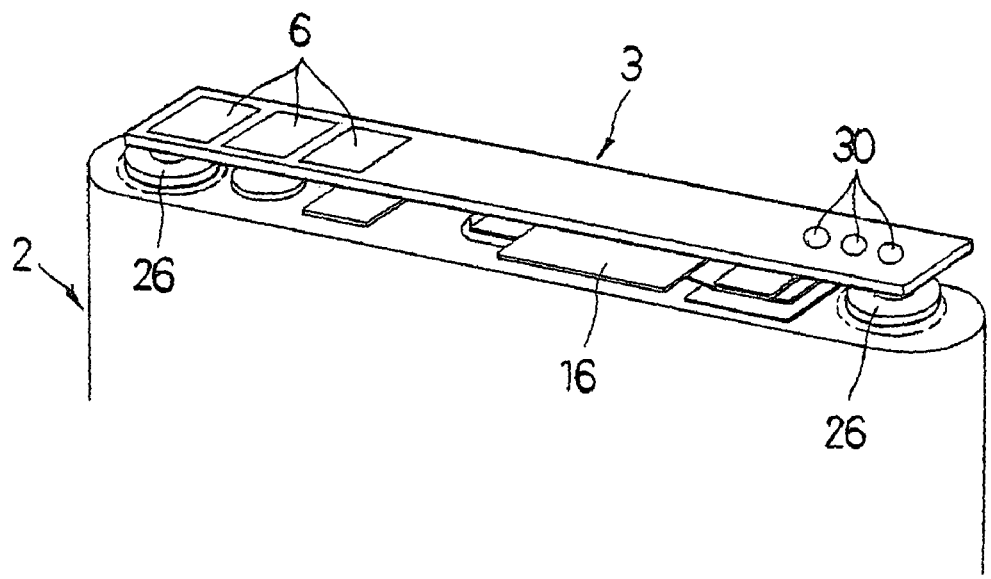
Figure 15A:
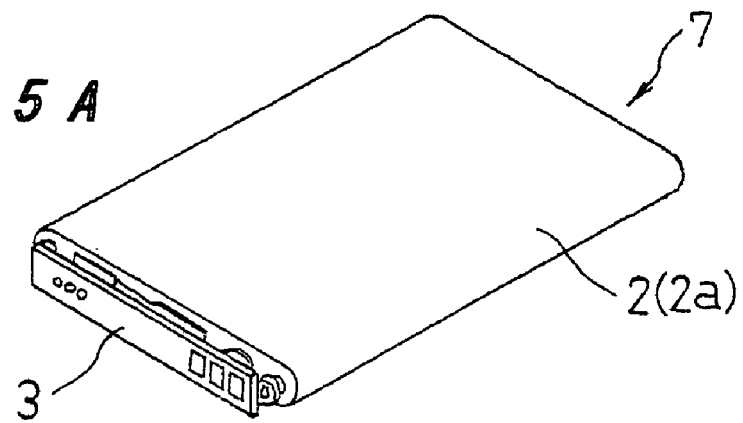
FIG. 15A to FIG. 15C are perspective views illustrating a formation process of production steps in chronological order.

To this rechargeable battery 2 with the temperature fuse 10 attached thereto is mounted a circuit substrate 3 using a positive lead plate 4 and a negative lead plate 5, as shown in FIG. 9A. The circuit substrate 3 includes a circuit for protecting the rechargeable battery 2 from overcharge, over discharge, and over current; on one side are formed the aforementioned external terminals 6 and the test terminal 30, and on the other side are mounted electronic components 31 such as ICs and positive and negative solder lands 32, 33 at both ends for the connection with the rechargeable battery 2; one end of the positive lead plate 4 is soldered to the positive solder land 32, and one end of the negative lead plate 5 is soldered to the negative solder land 33. The other end of the positive lead plate 4 is spot-welded on the face of the sealing plate 23, and the other end of the negative lead plate 5 on the connection piece 10b of the temperature fuse 10. The circuit substrate 3 is orthogonal to the face of the sealing plate 23 in this state; the positive and negative lead plates 4, 5 are then bent over so that the circuit substrate 3 is substantially parallel to the sealing plate 23 with a gap therebetween, as shown in FIG. 9B. The circuit substrate 3 is thus connected to the rechargeable battery 2 to form an object 7 to be resin packed shown in FIG. 15A.

Figure 10A:
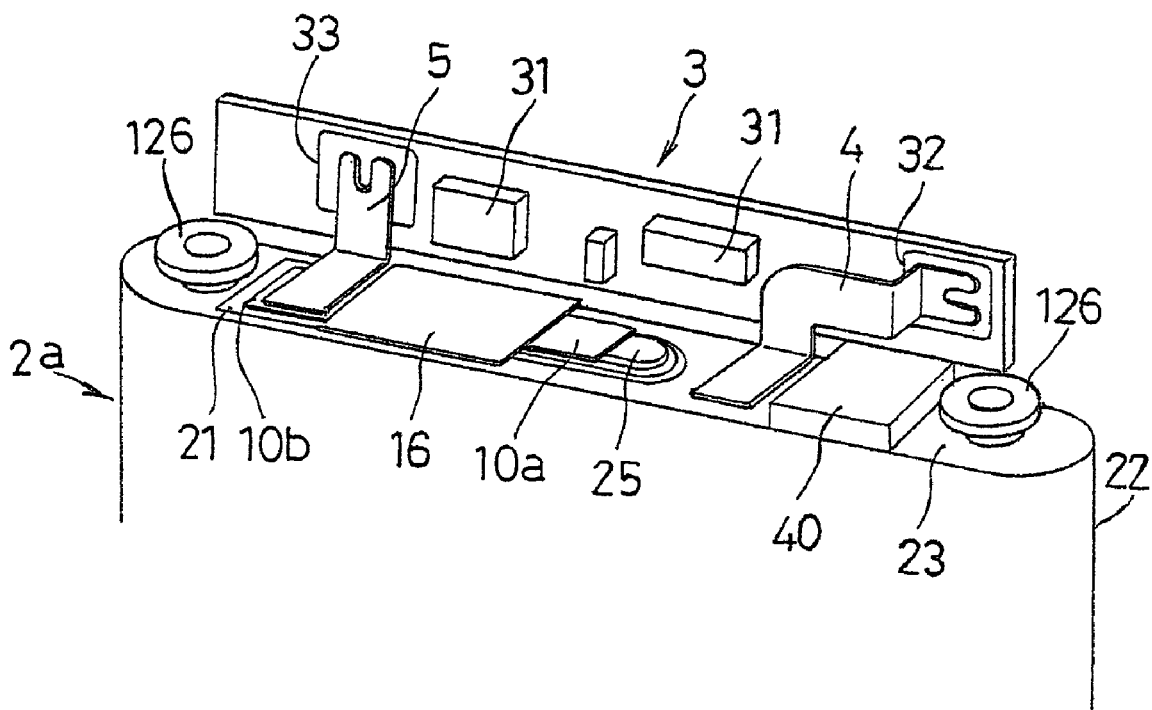
FIGS. 10A and 10B are perspective views illustrating the rechargeable battery to which engaging members have been welded, with a circuit substrate attached thereto.
Figure 10B:
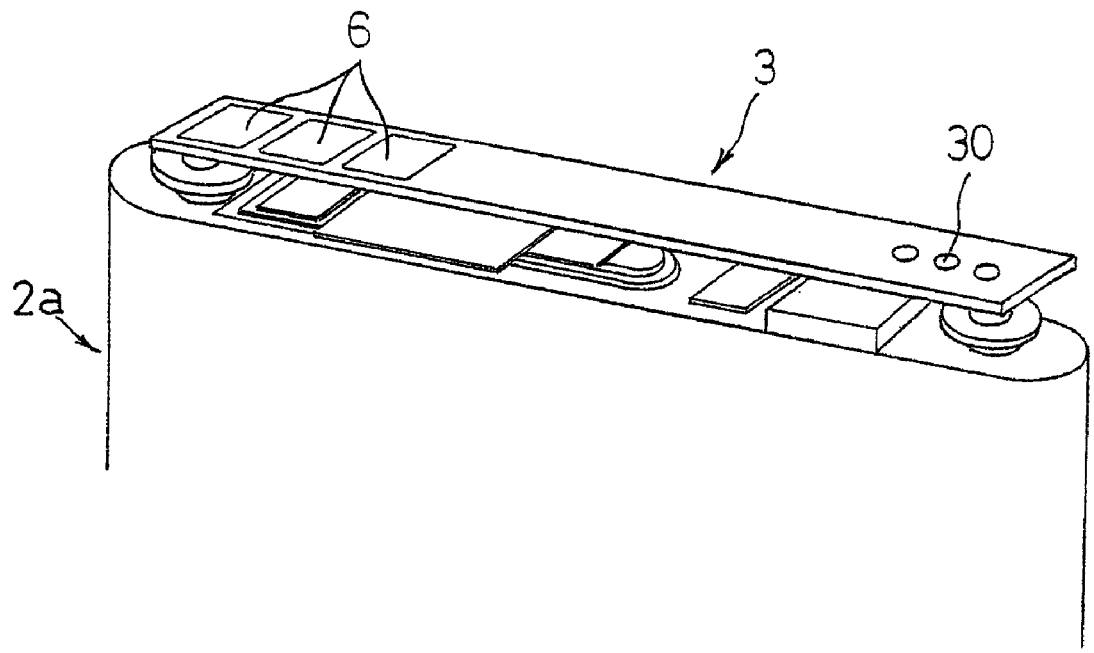

In the case with using the rechargeable battery 2a that has the engaging members 126 welded thereto and is formed with the safety vent 20, as shown in FIG. 10A, a connection piece 10a at one end of a temperature fuse 10 is welded to the rivet 25, and a heat insulation sheet 16 is affixed upon the upper face of the temperature fuse 10 so as to prevent fusion of the temperature fuse 10 during the resin filling process to be described later. A connection piece 10b at the other end of the temperature fuse 10 is placed upon an insulating paper 21 affixed on the sealing plate 23 and bonded to one end of the negative lead plate 5 to be described later by spot welding. Further, a resin sheet 40 is affixed upon the safety vent 20, and a circuit substrate 3 is connected to the rechargeable battery 2a using the positive and negative lead plates 4, 5 as shown in FIG. 10B to form an object to be resin packed 7 shown in FIG. 15A.

Figure 11:
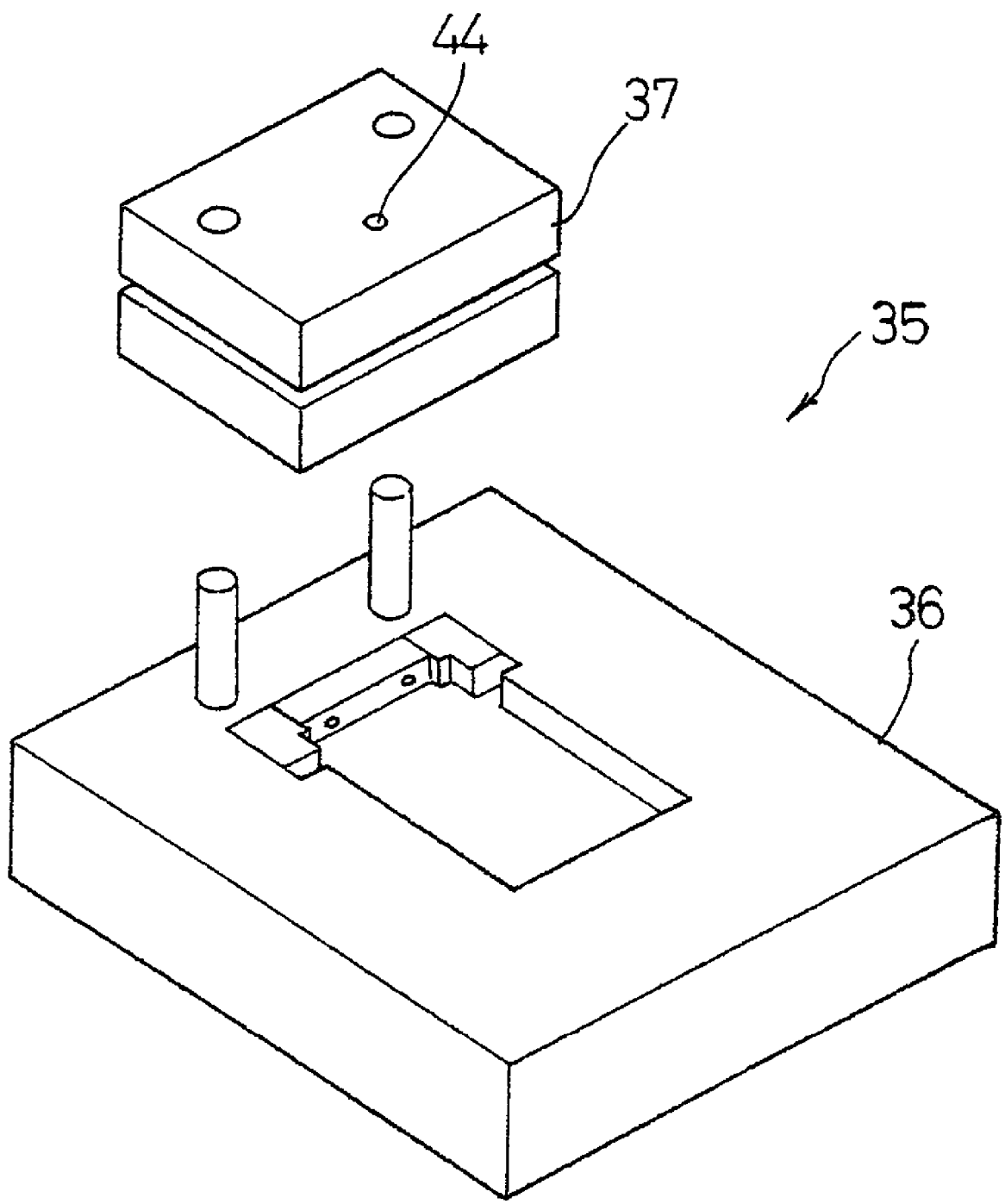
FIG. 11 is a perspective view illustrating the structure of a primary molding die.
Figure 12:
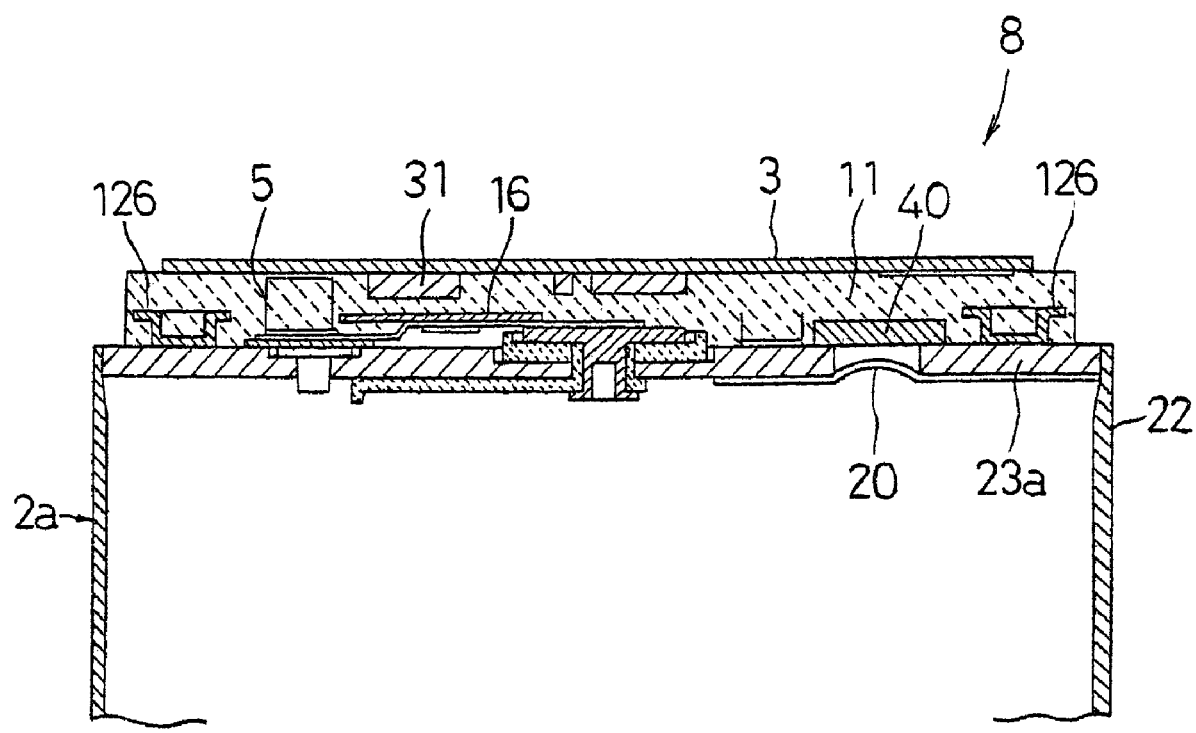
FIG. 12 is a cross-sectional view illustrating a resin mold formed by the primary molding.

Resin is filled in the gap between the rechargeable battery 2, 2a and the circuit substrate 3 of the object 7 to be resin packed to integrate them. The object 7 to be resin packed is placed inside a lower die 36 of a primary molding die 35 shown in FIG. 11, an upper die 37 is lowered onto the lower die 36, and resin is injected from a gate 44 in the upper die 37 into the gap between the rechargeable battery 2, 2a and the circuit substrate 3. The injected resin surrounds the electronic components 31 and positive and negative lead plates 4, 5 mounted on the circuit substrate 3 and bonds to the substrate 3, as well as surrounds the undercut portions of the engaging members 126 bonded on the sealing plate 23a of the rechargeable battery 2a and bonds to the sealing plate 23a, as shown in FIG. 12. Note, FIG. 12 shows the rechargeable battery 2a whose sealing plate 23a has the engaging members 126 welded thereto, but the resin will be molded in the same way in the case with using the rechargeable battery 2 with the sealing plate 23 having integral engaging protrusions 26.

Figure 15B:
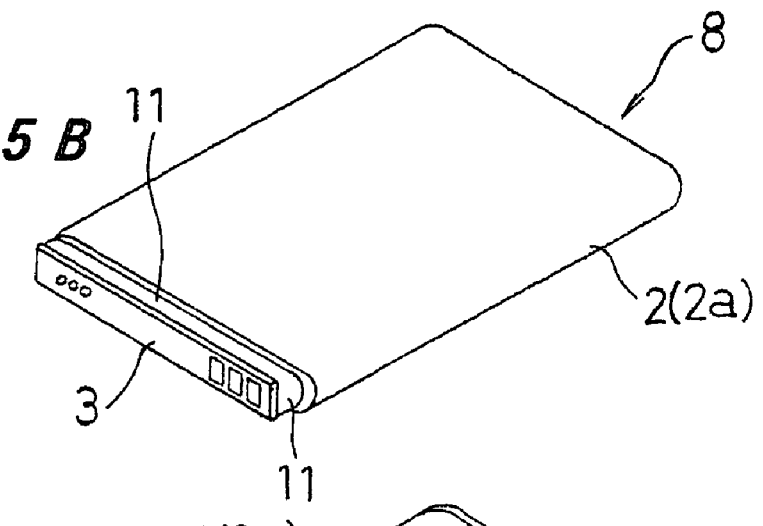

After curing the filled resin, an intermediate product 8 shown in FIG. 15B is taken out from the primary molding die 35. The engaging protrusions 26 or engaging members 126 engage with resin with its protruding parts biting into the primary mold 11 and with the resin filling its recessed parts, and moreover, their undercut portions provide an anchoring effect to retain the primary mold 11 onto the rechargeable battery 2, 2a and firmly couples the rechargeable battery 2, 2a and the circuit substrate 3, thus ensuring the bond between them.

This intermediate product 8 is made into a battery pack 1 by providing an outer covering. The outer covering is provided by a secondary molding process and a winding sheet affixing process. An insulator 14 is attached to the bottom face of the rechargeable battery 2, 2a before the secondary molding.

Figure 13:
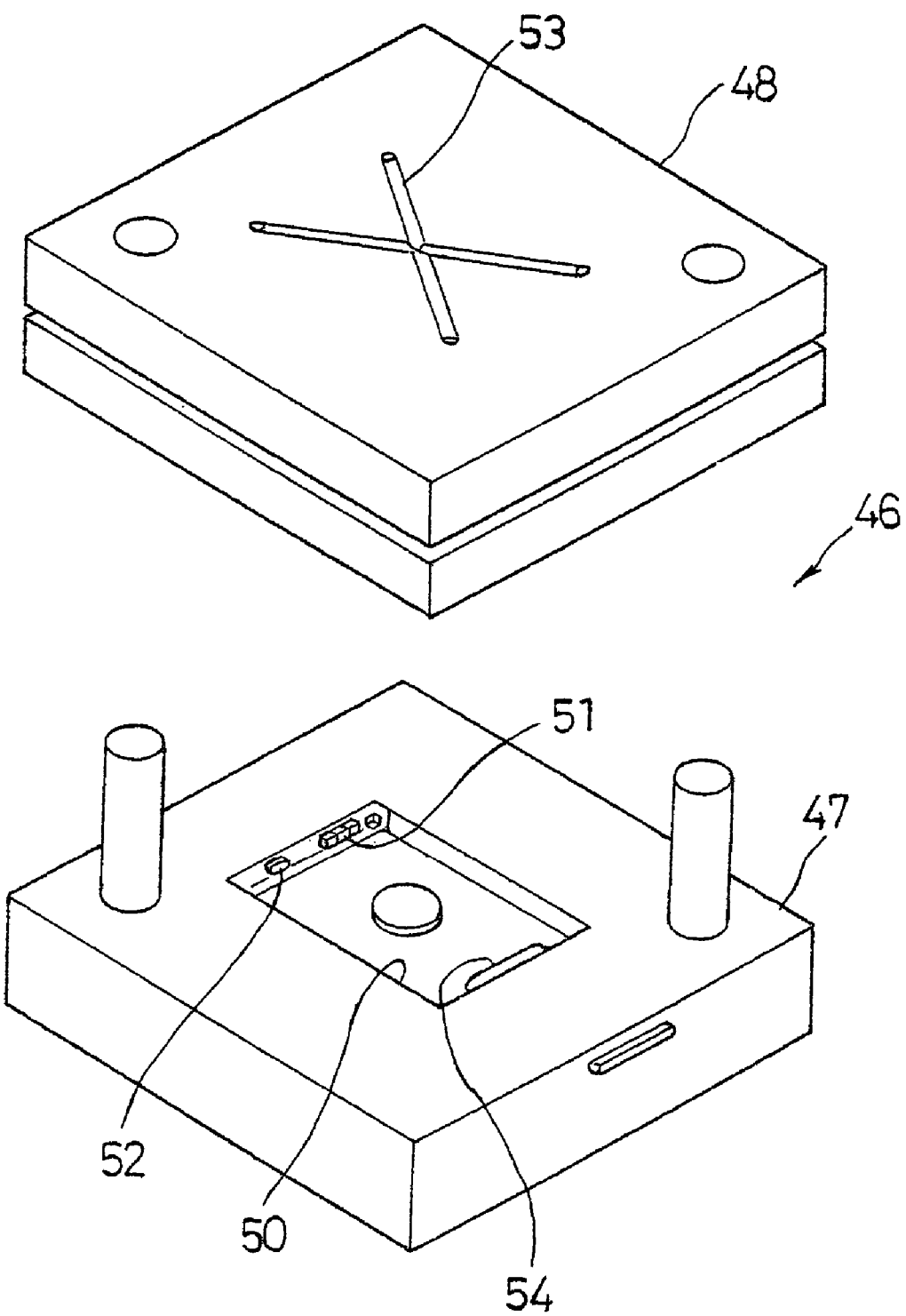
FIG. 13 is a perspective view illustrating the structure of a secondary molding die.

In the secondary molding, the intermediate product 8 is placed in a secondary molding die, so that predetermined parts of the intermediate product 8 are packed with resin. A lower die 47 of the secondary molding die 46 has a cavity 50 for accommodating the intermediate product 8 as shown in FIG. 13; in a wall on one side of the cavity 50 are provided inwardly biased projections 51, 52 for the three external terminals and the test terminal, and in the opposite wall is provided an inwardly biased projection 54 for the bottom face of the battery. When the intermediate product 8 is placed in the cavity 50 and these projections 51, 52, 54 are moved forward, they make pressure contact with the external terminals 6 at three locations on the circuit substrate 3, the test terminal 30, and the insulator 14 bonded on the bottom face of the rechargeable battery 2, 2a, respectively.

Figure 14:
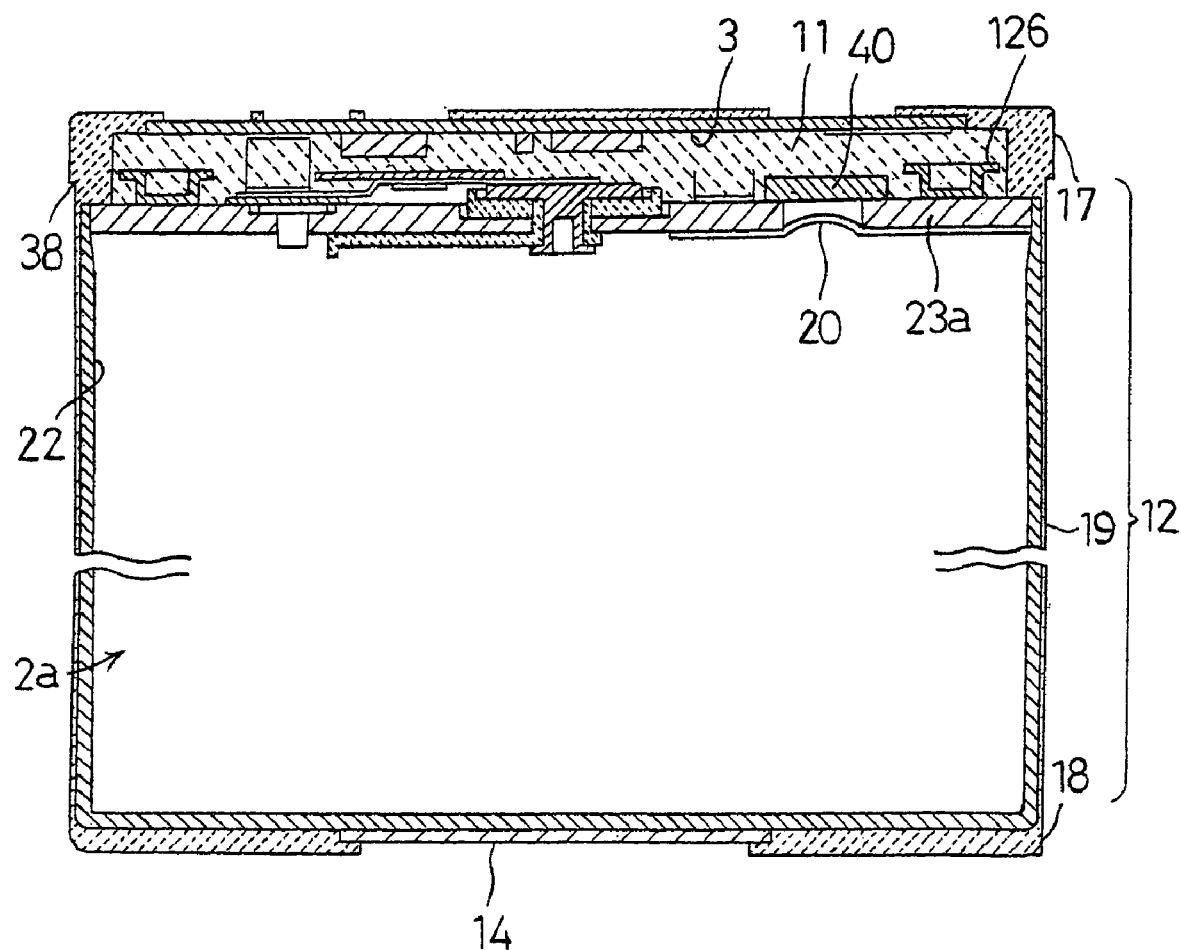
FIG. 14 is a cross-sectional view illustrating a resin mold formed by the secondary molding.
Figure 15C:
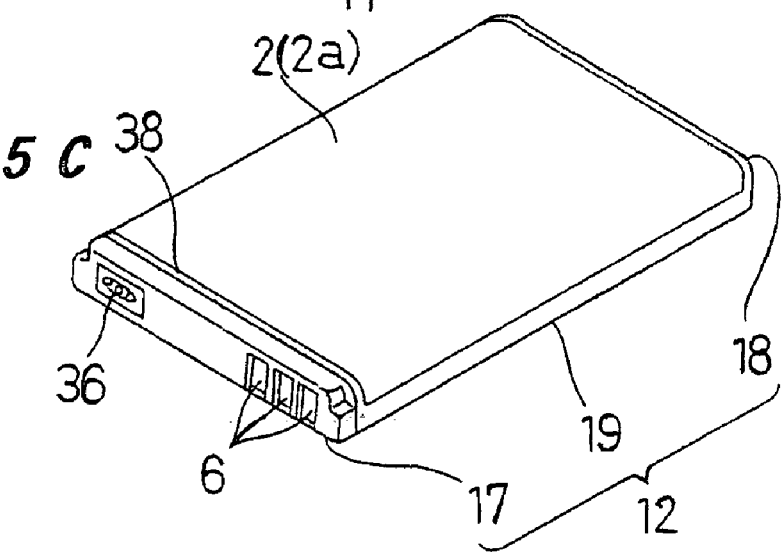

The lower die 47 in this state is then closed by an upper die 48, and resin is filled from a gate 53 in the upper die 48 into the secondary molding die 46. The resin is injected into the secondary molding die 46 from four locations for forming the following: An upper mold 17 fixed on the sealing plate 23a of the rechargeable battery 2a as shown in FIG. 15C and covering the primary mold 11 and the circuit substrate 3 while exposing the external terminals 6 and the test terminal 30 of the intermediate product 8 to the outside and exposing the central portion of the insulator 14 to the outside as shown in FIG. 14; a lower mold 18 fixed on the bottom face of the rechargeable battery 2a to a predetermined thickness such as to surround the insulator 14; and a connecting part 19 for coupling the upper mold 17 and the lower mold 18 along two corners on one side of the rechargeable battery 2a. The cross-sectional view of FIG. 14 illustrates the battery 2a with the sealing plate 23a having engaging members 26 welded thereto, but the same applies for the battery 2.

The upper mold 17 has a step 38 in its periphery near the battery 2a, which defines a line along which a winding sheet is wound around the periphery of the rechargeable battery 2a. The battery operation is then inspected using the test terminal 30, and the water ingress label 9 is bonded in the cavity surrounding the test terminal 30 of the batteries that have passed the inspection, whereby the battery pack 1 shown in FIG. 6 is obtained.

The battery pack 1 thus formed has curved shoulders on one flat side corresponding to the arc on both sides of the rechargeable battery 2, while the other two corners on the opposite side are right-angled because of the connecting part 19; this feature, coupled with the asymmetric arrangement of the external terminals 6, prevents the battery to be reversely loaded in equipment. The curved corners will snugly fit in rounded corners in the battery accommodation case of the equipment without leaving any dead space.

The above battery packs 1 were subjected to a 1.5 m free-fall test on a concrete surface for two cycles for all the six sides, and falling tests in which battery packs were dropped 50 times from a height of 1.0 m onto an iron plate and randomly checked for mechanical properties, and then dropped 200 times and randomly checked for electrical characteristics, after which they were subjected to a heat shock test in which they underwent temperature changes ranging from −40° C. to 80° C. for several times, a vibration test in which vibration was applied from three directions, and a terminal test in which load was applied to the external terminals. The battery packs 1 that underwent these tests were then loaded on equipment, and inspection was made for any abnormality in the fitting between battery and equipment and in their performance, or any deformation or looseness. The results showed that these battery packs that underwent various tests were trouble-free and proved to have a rigid structure.

Inspection was also made for the effects of the high temperature of more than 200° C. during the resin molding on the rechargeable battery 2, 2a and for any damage to the temperature fuse 10 arranged inside the filled resin, but no abnormality was found.

Further, the battery pack 1 was disassembled on purpose to see how it looks when disassembled; it was much harder to disassemble as compared to the common pack case structure, and it was obvious that it is disassembled, because when the primary mold 11 was broken, the engaging protrusions 26 or engaging members 126 at both ends of the sealing plate 23, 23a were torn apart, and the positive and negative lead plates 4, 5 and connecting parts inside the resin were also broken.

Moreover, variations in dimensions of various parts, including the distance from the bottom face to the external terminals 6 that must be precisely controlled, were all within a tolerance of plus or minus 0.1 to 0.2 mm, meaning that the battery packs would present no problem in the connection with the equipment.

The engaging protrusions 26 in the above structures are described as mushroom-shaped protrusions formed on the sealing plate 23 by way of example, but they may be formed as protrusions and/or recesses of various shapes in the sealing plate 23 as shown in FIG. 16A to FIG. 16D.

Figure 16A:
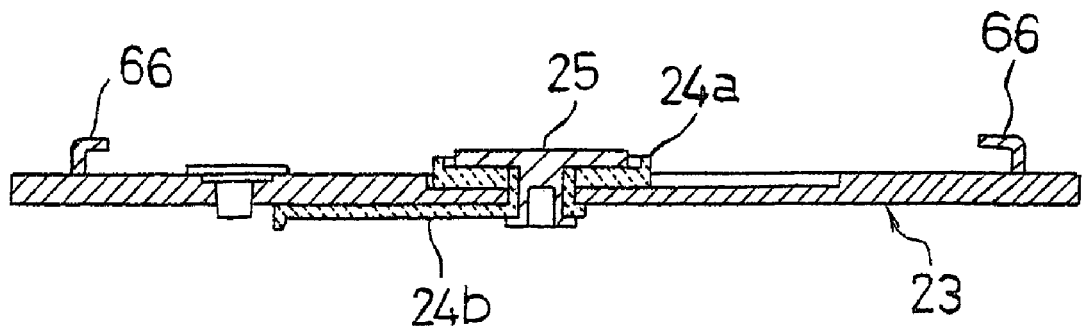
FIG. 16A to FIG. 16D are cross-sections of a sealing plate with various shapes of engaging protrusions.

The engaging protrusions 66 shown in FIG. 16A are inverted L shape protrusions on both sides of the sealing plate 23 and have undercut portions because of the inverted L shape. These engaging protrusions 66 may be formed by welding or bonding inverted L shape members onto the sealing plate 23.

Figure 16B:
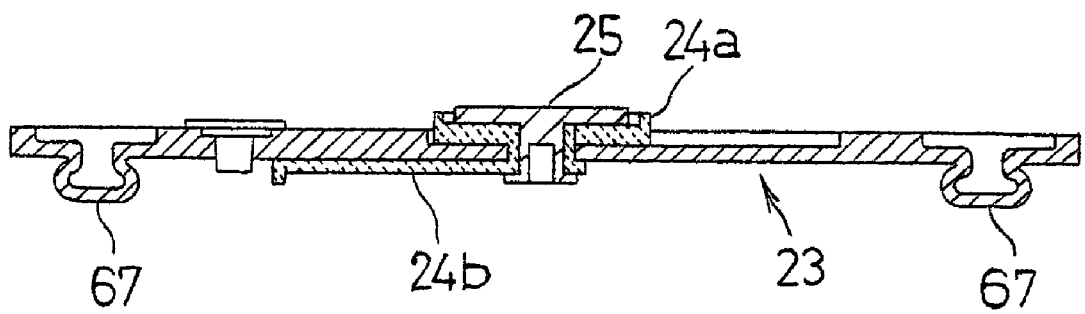

FIG. 16B shows a design in which engaging recesses 67 are formed in the sealing plate 23; undercut portions are formed in the recesses by first forming bottomed cylindrical recesses in the sealing plate 23 by a drawing process and then pressing the cylindrical portions so that they bulge. Molded resin will flow into these engaging recesses 67 and when it cures, it remains firmly engaged with the sealing plate 23 because of the undercut portions.

Figure 16C:
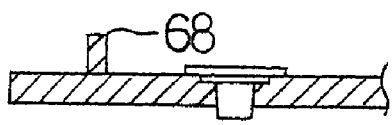
Figure 16D:
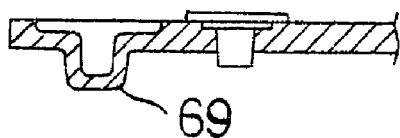

While the above engaging protrusions 66 and recesses 67 are both formed with undercut portions, other shapes without undercut portions such as protrusions 68 and recesses 69 shown in FIG. 16C and FIG. 16D are also effective in retaining resin.

While the rechargeable battery 2 manufactured with the sealing plate 23 that is formed with the above engaging protrusions 26 or recesses 67 is advantageously used in forming a battery pack by uniting the circuit substrate 3 onto the sealing plate 23 by resin molding as has been described above, such engaging protrusions 26 or recesses 67 will only be useless elements for general-purpose rechargeable batteries 2. The engaging members 126, which are separate components attached to the sealing plate 23a, are thus more preferable so that battery packs 1 are produced using general-purpose, mass-produced rechargeable batteries with circuit substrates 3 united thereto by resin molding, without having to prepare specially-processed rechargeable batteries 2. The engaging members 126 are simply welded on the sealing plates 23a of general-purpose rechargeable batteries 2a to obtain batteries with the same shape as that of the rechargeable batteries 2, with which battery packs 1 are produced through the above-described process steps.

The above embodiments show one example of a battery pack 1 of a rechargeable battery 2, 2a and a circuit substrate 3 united by resin packed onto the sealing plate 23, 23a of the battery; in other cases a circuit substrate 3 or terminal plate may be fixed onto the bottom face or a side face of the rechargeable battery 2, 2a with resin. In such a case, protrusions and/or recesses for retaining resin may be provided on the bottom face or side face of the battery case 22, so that the circuit substrate 3 or terminal plate is firmly fixed on the rechargeable battery 2, 2a by the resin.

INDUSTRIAL APPLICABILITY

According to the present invention, as described above, when uniting the rechargeable battery and the circuit substrate by resin molding into the battery pack, the filled resin is reliably engaged with the rechargeable battery; the invention thus provides a battery pack that is suitable as a battery power source of small portable electronic equipment, having enough rigidity to withstand impact in a falling accident or the like, and a structure for preventing accidental disassembly for wrong use.

The invention claimed is:

1. A battery, comprising:
   a battery case having a protrusion or a recess on a given surface of the battery case;
   a circuit substrate; and
   a molded resin body produced by molding and curing a curable resin on the given surface of the battery case so as to engage said one of a protrusion or a recess and thereby be retained on the given surface of the battery case to form a structure directly contacting an entire exterior surface of said one of a protrusion and a recess; and
   said protrusion or recess including an undercut portion that extends away from the given surface and is an engaging member attached on said given surface of the battery, said undercut portion being embedded within the molded resin body so that the molded resin body forms an intermediate resin layer between the circuit substrate and the given surface of the battery case which comprises a height defining top and bottom surfaces of the intermediate resin layer, the top surface being connected with the circuit substrate and the bottom surface being connected with the given surface of the battery case, each of the top and bottom surfaces of the intermediate resin layer being so connected so as to operatively connect the circuit substrate to the given surface of the battery case.

2. The battery according to claim 1, wherein the one of a protrusion and a recess is formed by press-forming on the given surface so as to be a contiguous portion of said battery case.

3. The battery according to claim 1, wherein the one of a protrusion and a recess is provided by welding or bonding a separate member onto the given surface.

4. The battery according to claim 1, wherein the one of a protrusion and a recess is formed on a sealing plate.

5. The battery according to claim 1, wherein said engaging member is attached on said given surface of the battery by resistance welding and engaging and retaining said molded resin body on the battery case.

6. The battery according to claim 5, wherein the engaging member is formed in a cylindrical shape having a face at a first end that is bonded to the battery case and a flange at a second end forming the undercut portion.

7. The battery according to claim 5, wherein the engaging member is formed in a bottomed tube-like shape having a bottom face bonded to the battery case and an open end having a flange forming the undercut portion.

8. The battery according to claim 5, wherein the engaging member is formed with one or a plurality of bosses on a surface bonded to the battery case.

9. A method for manufacturing a battery, comprising:
providing a battery case having a protrusion or a recess on a given surface thereof, said protrusion or a recess including an undercut portion that extends away from the given surface and is an engaging member attached on said given surface of the battery;
providing a circuit substrate;
molding and curing a resin body of curable resin on the given surface of the battery case; and
retaining the resin body on the battery case by effecting the molding so that the filled resin body is formed engaged with said protrusion or recess, said engagement including molding said resin body directly onto said battery case by depositing the resin comprising the resin body onto said given surface of the battery case so that the molded resin body forms an intermediate resin layer between the circuit substrate and the given surface of the battery case which comprises a height defining top and bottom surfaces of the intermediate resin layer, the top surface being connected with the circuit substrate and the bottom surface being connected with the given surface of the battery case, each of the top and bottom surfaces of the intermediate resin layer being so connected so as to operatively connect the circuit substrate to the given surface of the battery case.

10. The method for manufacturing a battery of claim 9, wherein said providing the battery case includes:
bonding a separate component on a given surface of a complete battery to provide said protrusion or recess; and
said retaining includes the resin body being retained on the complete battery by engagement of said protrusion or recess by the resin body effected during said molding.

11. The method for manufacturing a battery according to claim 10, wherein:
said separate component is an engaging member, said bonding the separate component includes:
setting said engaging member on the battery case in a predetermined position so that a bonding face thereof abuts on the battery case; and
applying a welding current across welding electrodes that are respectively in pressure contact with the engaging member and a portion of the battery case that is electrically conductive with the predetermined position so as to weld the engaging member to the predetermined position of the battery case.

12. The battery according to claim 1, wherein:
the engaging member includes the undercut portion extending away from the given surface; and
the engaging member is formed in a cylindrical shape having a face at a first end that is bonded to the battery case and a flange at a second end forming said undercut portion, and said engaging includes molding said molded resin body onto said battery case so as to form a structure enveloping an exterior surface of said flange including a surface of said undercut portion.

* * * * *